United States Patent
Shiroishi et al.

(10) Patent No.: US 8,238,119 B2
(45) Date of Patent: Aug. 7, 2012

(54) ELECTRONIC DEVICE

(75) Inventors: Toshikazu Shiroishi, Hamura (JP); Tomohiro Hamada, Tachikawa (JP); Tomoko Kitamura, Ome (JP); Toshio Konno, Akiruno (JP); Kohei Wada, Tachikawa (JP); Ryosuke Saito, Koganei (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/878,911

(22) Filed: Sep. 9, 2010

(65) Prior Publication Data

US 2011/0149545 A1    Jun. 23, 2011

(30) Foreign Application Priority Data

Dec. 22, 2009 (JP) ................................ 2009-291295

(51) Int. Cl.
*H05K 9/00* (2006.01)
(52) U.S. Cl. ................ 361/807; 361/810; 361/803
(58) Field of Classification Search ............ 361/679.01, 361/799, 800–803, 807, 810; 174/35 R, 174/50–51; 439/607.01
See application file for complete search history.

(56) References Cited

U.S. PATENT DOCUMENTS

| | | | | |
|---|---|---|---|---|
| 5,340,334 A * | 8/1994 | Nguyen | | 439/620.12 |
| 6,320,122 B1 * | 11/2001 | Dickey et al. | | 174/359 |
| 6,339,536 B1 * | 1/2002 | Buican et al. | | 361/818 |
| 6,343,953 B2 * | 2/2002 | Nakamura et al. | | 439/589 |
| 6,359,214 B1 * | 3/2002 | Worley et al. | | 174/366 |
| 6,653,556 B2 * | 11/2003 | Kim | | 174/358 |
| 6,943,287 B2 * | 9/2005 | Lloyd et al. | | 174/359 |
| 7,636,244 B2 * | 12/2009 | Kriege et al. | | 361/800 |
| 2008/0055258 A1 | 3/2008 | Sauers | | |

FOREIGN PATENT DOCUMENTS

| | | |
|---|---|---|
| JP | 06-260785 A | 9/1994 |
| JP | 2000-340305 | 12/2000 |
| JP | 2001-332886 A | 11/2001 |
| JP | 2002-217754 A | 8/2002 |
| JP | 2009-64663 | 3/2009 |
| JP | 2010-503085 | 1/2010 |
| WO | WO 2008/028644 A1 | 3/2008 |

OTHER PUBLICATIONS

Notice of Reasons for Rejection mailed by Japan Patent Office on Nov. 2, 2010 in the corresponding Japanese Patent Application No. 2009-291295.

* cited by examiner

*Primary Examiner* — Hung S Bui
(74) *Attorney, Agent, or Firm* — Knobbe, Martens, Olson & Bear LLP (57) ABSTRACT

According to one embodiment, a USB port for connecting a note PC to an external device includes a rib structure that faces an opening formed in a side wall of the housing of the note PC and receives a gasket. The rib structure includes a frame member surrounding the gasket, and a plurality of ribs. The frame member has a cutout formed in a portion thereof remote from the side wall. When the gasket is pressed and elastically deformed by the receptacle of a connector, the deformed portion of the gasket escapes through the cutout.

8 Claims, 6 Drawing Sheets

ELECTRONIC DEVICE

CROSS-REFERENCE TO RELATED APPLICATIONS

This application is based upon and claims the benefit of priority from Japanese Patent Application No. 2009-291295, filed Dec. 22, 2009; the entire contents of which are incorporated herein by reference.

FIELD

Embodiment described herein relate generally to an electronic device having a receptacle that can be connected to the plug of a connector, such as a serial advanced technology attachment (SATA) connector or a universal serial bus (USB) connector.

BACKGROUND

A shielded housing is known on which measures against electro magnet interference (EMI) are taken. The shielded housing being obtained by bonding the metal escathion of a display panel to the back cover with a conductive gasket held therebetween. The back cover of the shielded housing is formed of a conductive resin that can be easily processed.

By thus forming the back cover of a resin, a gasket fixing rib serving to prevent detachment of the gasket can be protruded from the back cover, thereby preventing detachment of the gasket from between the escathion and the back cover.

The above-mentioned conductive gasket can be used in such an electronic device as a notebook type personal computer (hereinafter referred to simply as a "note PC"), as well as in a PDP. In general, note PCs are provided with receptacles for connectors, such as SATA and USB connectors, to be connected to an external device such as a flash memory. Further, the note PCs require anti-EMI measures as in the above-mentioned PDP, and therefore the inner surfaces of the housings of the note PCs are generally coated with a conductive material.

When an external device is connected to a note PC via a connector, it is necessary to take measures against static electricity on the connector to prevent static electricity charged on the external device from being transmitted to the circuit board of the note PC via the connector. To this end, in general, a conductive gasket is attached to the housing of the PC in contact with the conductive material that is provided on the housing for preventing EMI, and a receptacle for the connector is attached to the housing with the gasket interposed therebetween. Namely, conduction between the receptacle and the conductive material is secured using the restoring force of the gasket.

However, when conduction is secured by holding the elastic gasket between the two members to strongly press the gasket, variations will occur in contact pressure in accordance with the shapes of the members that contact the deformed gasket, although contact pressure necessary for the members can be secured using the restoring force of the gasket as mentioned above. For instance, if the deformed gasket is stranded on, for example, the rib to thereby cause locally high contact pressure, the gasket may be plastically deformed. Once part of the gasket is plastically deformed, uniform contact pressure may not be obtained between the two members.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to the embodiment of the invention, an USB port 18 for enabling a note PC to be connected to an external device comprises a rib structure 10 used to receive a gasket and facing an opening 18a formed in a side wall 16c of a housing 16. The rib structure 10 includes a frame member 1 for surrounding the gasket, and a plurality of ribs 4, 5 and 6. The rib structure 10 has a cutout 3 formed away from the side wall 16c of the frame member 1 for permitting escape of a part of the gasket deformed when the gasket is strongly pressed by the receptacle of a connector.

Figure 1:
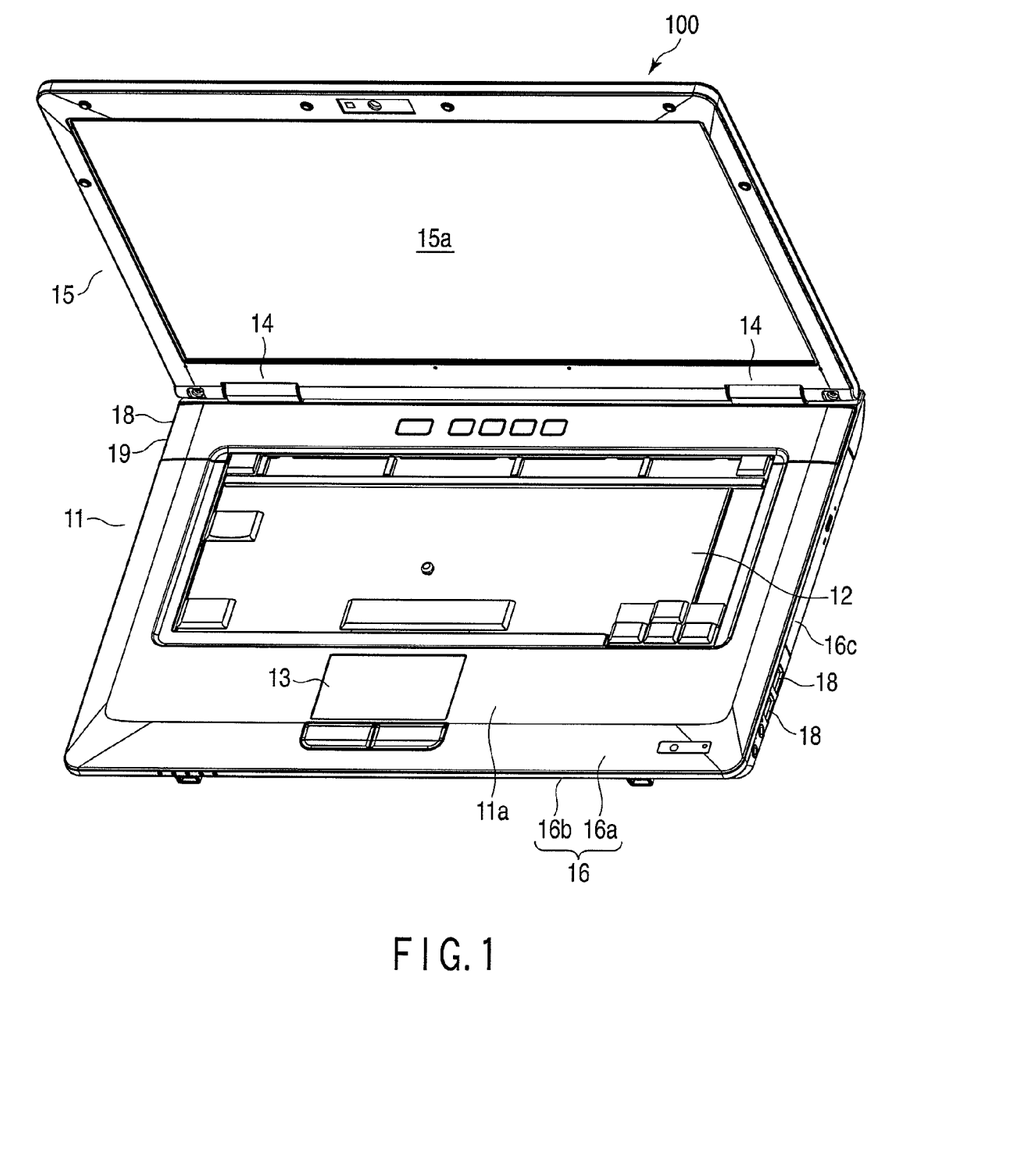
FIG. 1 is a perspective view illustrating an example of an electronic device according to an embodiment of the invention.

FIG. 1 is a perspective view illustrating a notebook type personal computer 100 (hereinafter referred to simply as a "note PC 100") as an example of an electronic device according to the embodiment of the invention.

As shown in FIG. 1, the note PC 100 comprises a PC main unit 11 having a surface 11a on which a keyboard 12, a touch pad 13, etc. are provided, and a display panel 15 rotatably attached to the rear end of the PC main unit 11 via hinges 14. The display panel 15 has a display screen 15a, and is rotatable between an open position in which the surface 11a of the PC main unit 11 is exposed, and a closed position (not shown) in which the surface 11a is not exposed.

Figure 6:
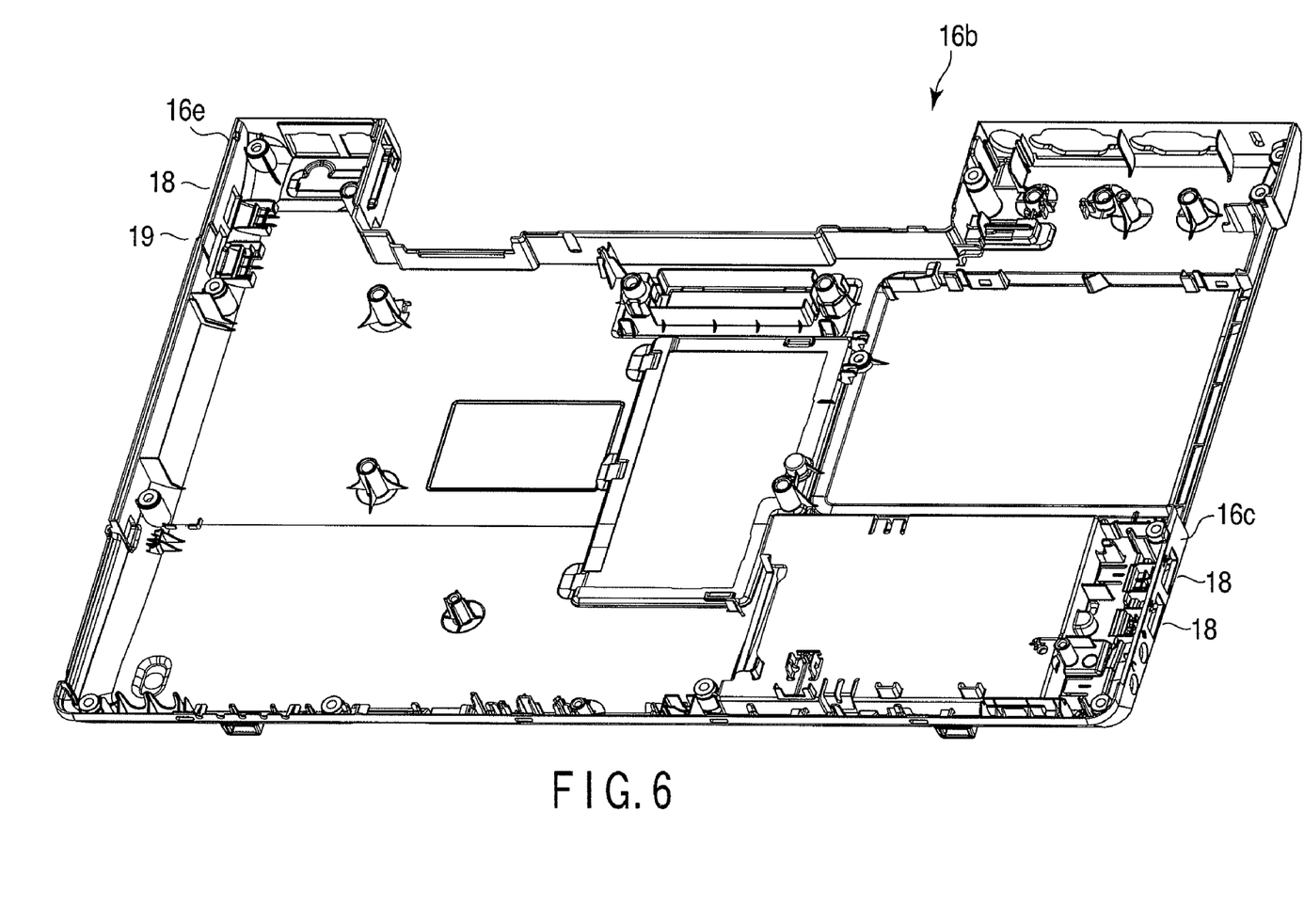
FIG. 6 is a perspective view illustrating part of the housing of the electronic device shown in FIG. 1.
Figure 7:
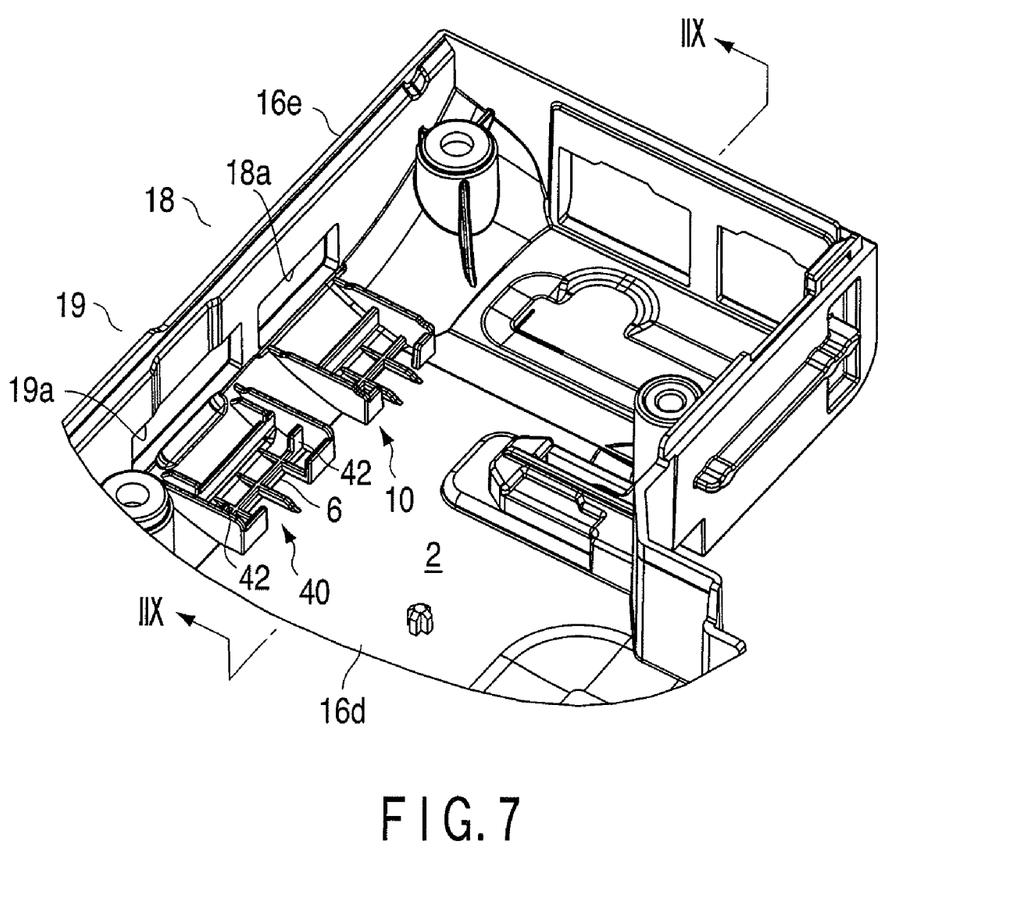
FIG. 7 is an enlarged perspective view illustrating an essential part of the housing shown in FIG. 6.

The PC main unit 11 comprises a rectangular housing 16 that includes a housing component 16a located at the surface 11a side and provided with input units 12 and 13, and a housing component 16b (see FIG. 6) located at the reverse side and engaged with the housing component 16a. As shown in FIG. 6, two USB ports 18 for connecting external devices (not shown) are formed adjacent to each other in the right-hand side wall 16c of the housing component 16b. Similarly, a USB port 18 is formed in the left-hand side wall 16e of the housing component 16b, as shown in FIGS. 6 and 7. Further, a SATA port 19 wider than the USB ports 18 is formed in the left-hand side wall 16e.

Referring then to FIGS. 2 to 5, a detailed description will be given of the structure of the above-mentioned USB ports 18, and measures taken against static electricity for USB connectors connected to the note PC via the USB ports 18. Although in the embodiment, the USB connectors are described, it is a matter of course that the invention is not limited to the USB connectors, but the anti-static-electricity measures of the invention are also applicable to other types of connectors, such as SATA connectors shown in FIGS. 6 to 8.

An external device connected to the note PC 100 via the USB port 18 may be charged with static electricity. If the static electricity is transmitted via a USB connector, to a circuit board 32, described later, housed in the note PC 100, various disadvantages will occur. To avoid this, it is necessary to take measures against static electricity for the connectors for connecting the note PC to external devices.

Figure 2:
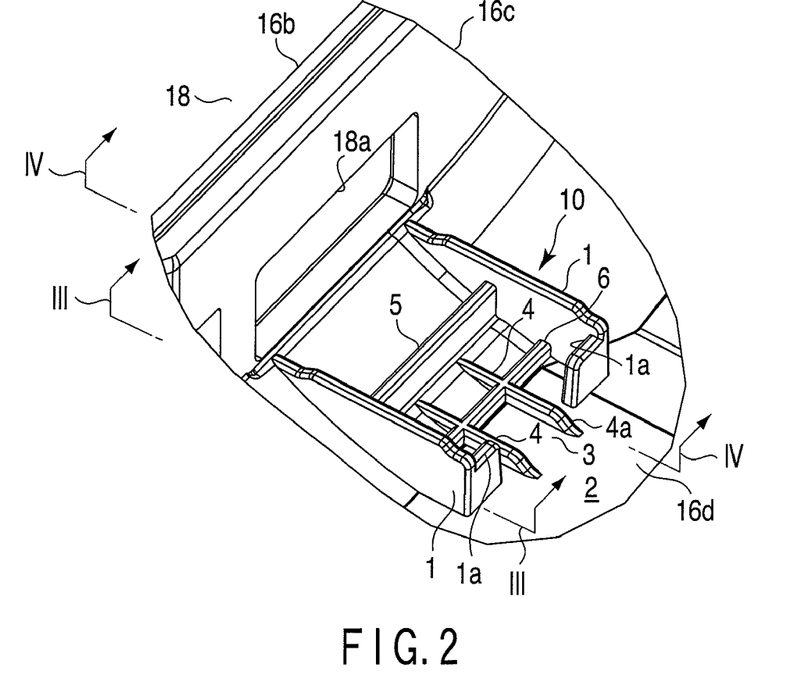
FIG. 2 is an enlarged perspective view illustrating a rib structure provided on the inner surface of the electronic device.
Figure 3:
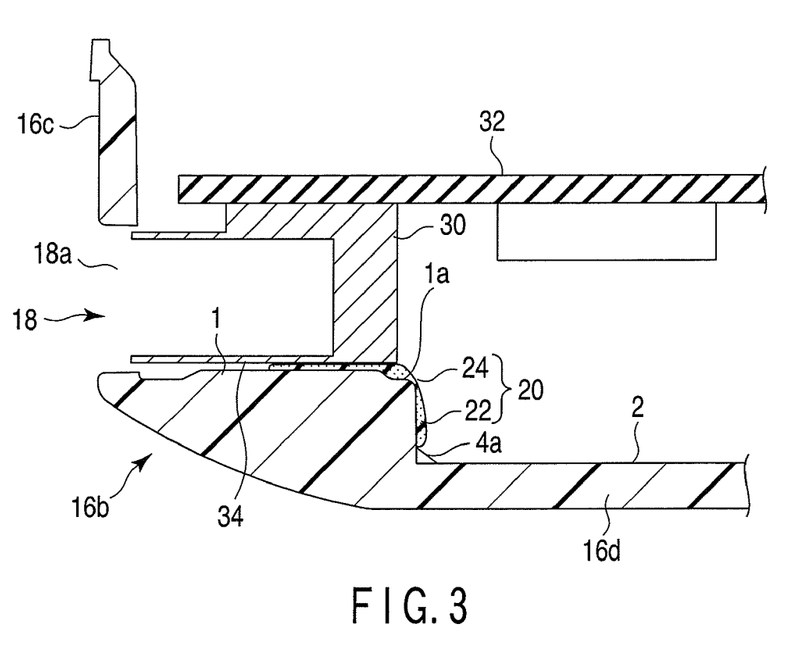
FIG. 3 is an enlarged sectional view taken along line III-III of FIG. 2, and illustrating an assembly of the rib structure, a gasket and a receptacle.
Figure 4:
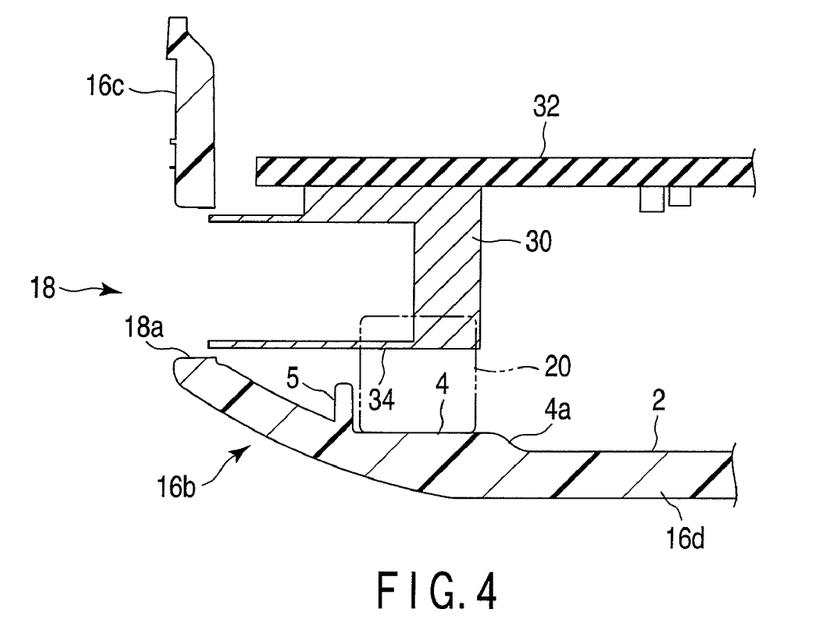
FIG. 4 is an enlarged sectional view taken along line IV-IV of FIG. 2, and illustrating the gasket located between the rib structure and the receptacle, using the two-dot chain line.
Figure 5:
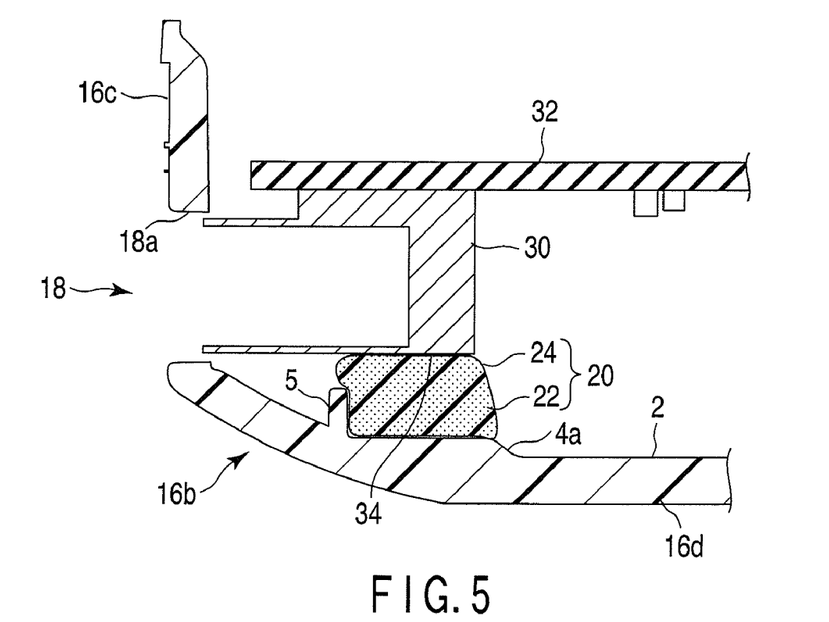
FIG. 5 is an enlarged sectional view illustrating a state in which the gasket is attached between the rib structure and the receptacle.

FIG. 2 is an enlarged perspective view illustrating the rib structure 10 projecting from the inner surface of the bottom 16d of the housing component 16b of the PC main unit 11, and facing the opening 18a of each USB port 18 formed in the side wall 16c (16e) of the housing component 16b. FIG. 3 is an enlarged sectional view taken along line III-III of FIG. 2, and illustrating an assembly of the rib structure 10, and the receptacle 30 pressed against the rib structure with the gasket 20 interposed therebetween. FIG. 4 is an enlarged sectional view taken along line IV-IV of FIG. 2, and illustrating, using the two-dot chain line, the state of the gasket 20 assumed before it is pressed. FIG. 5 is an enlarged sectional view illustrating a state in which the gasket 20 is pressed between the rib structure 10 and the receptacle 30.

Substantially the entire inner surface of the bottom 16d of the housing component 16b is coated with a conductive material 2 as anti-EMI measures. The rib structure 10 is also coated with the conductive material 2 to thereby provide a conductive surface successive to the inner surface of the bottom 16d of the housing component 16b. Although in the embodiment, the rig structure 10 is formed integral with the inner surface of the bottom 16d as one body, the rib structure 10 may be formed separate from the housing component 16b, and be adhered thereto using, for example, an adhesive.

As shown in FIG. 5, the gasket 20 has a structure obtained by winding elastic sponge 22 in the form of a rectangular block with a conductive rectangular cloth member 24. The gasket 20 is received in the rib structure 10 such that the cloth member 24 faces an opening 18a formed in the side wall 16c of the housing component 16b. When the gasket 20 is received in the rib structure 10, the externally wound cloth member 24 is brought into contact with the surface 2 of the rib structure 10, whereby they are electrically connected.

The rib structure 10 includes the substantially rectangular frame member 1 for surrounding the gasket 20. The frame member 1 has a cutout 3 at an inward end thereof remote from the opening 18a formed in the side wall 16c of the housing component 16b. The cutout 3 is formed by cutting a part of the frame member 1 located away from the opening 18a. In other words, the gasket 20 is received in the frame member 1, with the externally wound cloth member 22 opposed to the cutout 3. The frame member 1 of the rib structure 10 has an appropriate size for receiving the gasket 20, and therefore also functions to position the gasket 20.

Inside the frame member 1, slim ribs 4, 5 and 6 project from the inner surface 2 (bottom surface) of the bottom 16d of the housing component 16b to the gasket 20, and are arranged in the form of a lattice. More specifically, the two ribs 4 project from the inner surface 2 of the housing component 16b such that they extend parallel to each other and perpendicular to the side wall 16c of the housing component 16b. Further, the two ribs 5 and 6 project from the inner surface 2 of the housing component 16b such that they extend parallel to each other and perpendicular to the two ribs 4 (i.e., parallel to the side wall 16c). The heights of the four ribs 4, 5 and 6 are set lower than the height of the frame member 1. The four ribs 4, 5 and 6 are also coated with the conductive material 2.

The rib 5, which is located closer to the wide wall 16c than the rib 6, is set highest among all ribs (i.e., the two parallel ribs 4 and the other rib 6), and is designed to be engaged with the front lower edge of the gasket 20 (the front side means the side closer to the side wall 16c). Thus, the rib 5 functions as a positioning member. Further, the other three ribs 4 and 6 that are lower than the rib 5 function to support a bottom surface of the gasket 20. The height of the three ribs 4 and 6 is set so that the upper end of the gasket 20 is slightly higher than the upper end of the frame member 1 when the gasket 20 is received within the frame member 1. Namely, the gasket 20 is placed on the three ribs 4 and 6, with the cloth member 24 kept contact with the upper ends of the three ribs 4 and 6 (see FIG. 4).

The end 4a (see FIG. 4) of each rib 4 remote from the side wall 16c extends through the cutout 3 to the outside of the frame member 1. The end 4a of each rib 4 has a downward slope to the bottom 16d.

After the gasket 20 is received in the frame member 1 of the rib structure 10, with the cloth member 24 opposed to the cutout 3, the receptacle 30 of the USB connector is placed on the rib structure 10 to press the gasket 20. At this time, the receptacle 30 is fixed on the circuit board 32 to be received in the PC main unit 11, and when the circuit board 32 is attached, the receptacle 30 is pressed against the gasket 20. The receptacle 30 has a flat pressing surface 34 remote from the circuit board 32. The gasket 20 is attached to the upper ends of the ribs 4 and 6, using a double-sided tape member.

When the circuit board 32 is attached inside the housing component 16b as the reverse-side housing component of the PC main unit 11, the end of the circuit board, to which the receptacle 30 is attached, is firstly made to approach the side wall 16c of the housing component 16b, the end of the receptacle 30 close to the opening 18a is fitted into the opening 18a of the side wall 16c. Thereafter, the gasket 20 is gradually flattened by the flat pressing surface 34 of the receptacle 30, whereby the circuit board 32 is rotated to a position at which it is parallel o the bottom inner surface 2 of the housing component 16b. Thus, the attachment is completed.

At this time, the gasket 20 received in the rib assembly 10 is pressed by the pressing surface 34 of the receptacle 30, whereby it is elastically deformed. As a result, the conductive cloth member 24 as the outer member of the gasket 20 is pressed against the bottom of the rib structure 10, and also against the pressing surface 34 of the receptacle 30, thereby electrically connecting the receptacle 30 to the rib structure 10 (i.e., the inner surface 2 of the bottom of the housing).

Further, at this time, the deformed portion of the gasket 20 protrudes through the cutout 3 formed in the frame member 1 of the rib structure 10. This state is shown in FIG. 5. Namely, at this time, the cutout 3 of the frame member 1 functions to permit the deformed portion of the gasket 20 to escape from the frame member, thereby making, uniform, the contact pressure of the gasket 20 against the pressing surface 34 of the receptacle 30. In other words, the cutout 3 serves to prevent plastic deformation of the gasket 20.

The deformed portion of the gasket 20 also protrudes over the upper end of the rib 5 that stops the lower end of the gasket 20 close to the side wall 16c. However, since there is a gap between the upper end of the rib 5 and the pressing surface 34 of the receptacle 30, the gasket 20 is prevented from being strongly pressed and plastically deformed.

Further, recesses 1a are provided at upper portions of the frame member 1 of the rib structure 10, which oppose the pressing surface 34 of the receptacle 30, as is shown in FIGS.

2 and 3. The recesses 1a are formed continuously with the cutout 3 and smoothly inclined to cooperate with the cutout 3 to let the gasket 20 escape therethrough.

The above-mentioned cutout 3 and recesses 1a function as means for permitting the deformed portion of the pressed gasket 30 to escape from the frame member 1. If the cutout 3 and recesses 1a are not provided, the deformed gasket 20 will protrude over the upper end of the frame member 1 to the outside of the same. In this case, the deformed portion of the gasket 20 protruding over the frame member 1 may well be strongly pressed and plastically deformed by the pressing surface 34 of the receptacle 30 provided on the upper end of the frame member 1 with a slight gap formed therebetween.

To avoid this, in the embodiment, the cutout 3 and the recesses 1a are formed in the frame member 1 of the rib structure 10 that receives the gasket 20, thereby permitting the deformed portion of the gasket 20 to escape therethrough. As a result, plastic deformation can be avoided and a good contact state of the gasket 20 can be maintained over a long time.

In other words, in the embodiment, since the cutout 3 is formed in the rib structure 10 for receiving the gasket 20, electrical connection can reliably be established between the receptacle 30 of the connector and the inner surface 2 of the bottom 16d of the housing component 16b. Thus, sufficient measures have been taken against static electricity. At this time, since the ends 4a of the two ribs 4 provided on the bottom of the rib structure 10 are extended to the outside of the cutout 3 and inclined, they can also be kept in contact with the deformed portion of the gasket 20 protruding from the cutout 3, whereby a better contact state can be maintained.

In particular, in the embodiment, the position of the cutout 3 in the frame member 1 of the rib structure 10 for receiving the gasket 20 is set depending upon whether the conductive cloth 24 of the gasket 20 is left-handed or right-handed. Namely, when the gasket 20 is pressed, the sponge 22 will protrude through the end of the gasket 20 on which no cloth member 24 is wound, while the cloth member 24 will be deformed in a direction in which the cloth member 24 is wound. In other words, the direction in which the gasket 20 wound by the cloth member 24 substantially depends upon the direction in which the cloth member 24 is wound. In light of this, in the embodiment, the position of the cutout 3 in the frame member 1 is set so that the deformed portion of the gasket 20 can escape through the cutout 3.

In particular, when the circuit board 32 is attached, it is rotated from a position at which it is inclined, to a position at which it is set parallel to the bottom. Therefore, in the initial state, the pressing surface 34 of the receptacle 30 is pressed against the upper surface of the gasket 20 while it is inclined. As a result, the pressing force of the pressing surface 34 is obliquely applied to the upper surface of the gasket 20, thereby pressing the gasket 20 inwardly. Namely, the cutout 3 formed in this position enables the deformed portion of the gasket 20 to escape therethrough.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For instance, although in the above-described embodiment, the invention is applied to the note PC as measures against static electricity, it is not limited to this, but may be applied to PDAs or other electronic devices.

Figure 8:
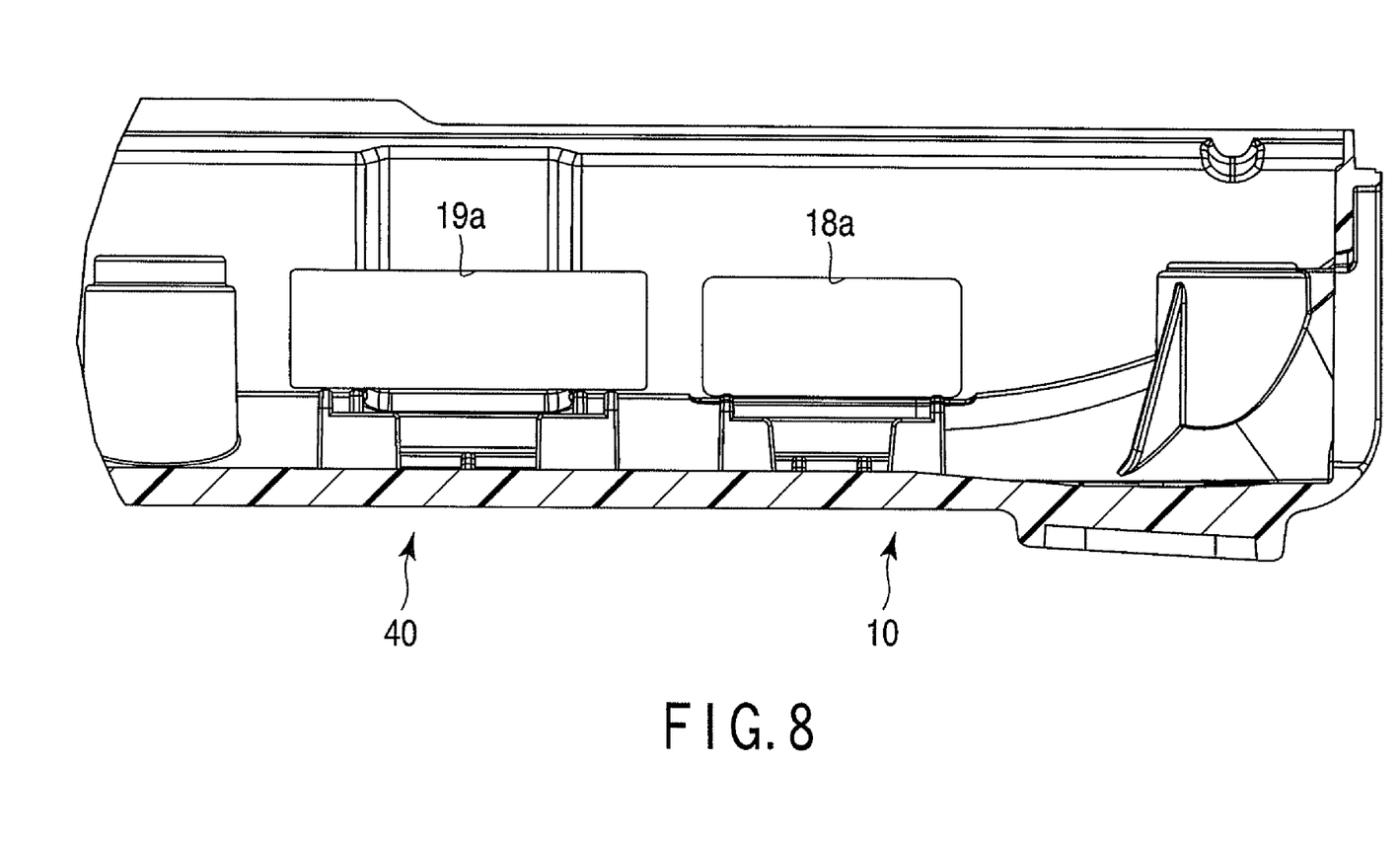
FIG. 8 is an enlarged sectional view taken along line IIX-IIX of FIG. 7.

Further, although in the above embodiment, the invention is applied to the USB connectors, it is not limited to this, but to connectors of different sizes as shown in FIGS. 6 to 8. A description will now be given of the case where the invention is applied to a SATA connector that has a slightly wider than the above-described USB connectors.

In this case, since a gasket 20 of the same size (width) as that of the gasket for the USB connector is used, a structure for supporting the widthwise opposite ends of the gasket 20 (along the side wall 16c) is added. More specifically, as shown in FIG. 7, a rib structure 40, which projects from the inner surface 2 of the bottom 16d and faces a port 19 for a SATA connector, has two stoppers 42 to be engaged with the widthwise opposite ends of the gasket 20 (more specifically, the lower ends of the opposite ends of the gasket 20).

The stoppers 42 are formed integral as one body with the rib structure by upwardly bending the opposite ends of the above-mentioned rib 6, and have a size that enables the stoppers to be brought into contact with the lower ends of the gasket 20. Namely, while the frame member 1 of the above-described rib structure 10 for USBs has a size just for receiving the gasket 20, the stoppers 42 of the rib structure 40 limit widthwise movement of the gasket 20.

What is claimed is:

1. An electronic device comprising:
a housing comprising a conductive inner surface;
a conductive elastic member;
a receptacle of a connector to be connected to an external device, the receptacle being housed in the housing, abutting on the elastic member from a side opposite to the inner surface of the housing, and pressing the elastic member against the inner surface of the housing; and
a frame member projecting from the inner surface of the housing, surrounding the elastic member, and including a region for pressing a surrounding of the elastic member between the receptacle and the inner surface of the housing, and a region for releasing the surrounding of the elastic member between the receptacle and the inner surface of the housing from the pressing.

2. The electronic device of claim 1, wherein a rib projecting to the elastic member is provided on the inner surface of the housing inside the frame member.

3. The electronic device of claim 2, wherein the rib provided on the inner surface of the housing extends along the inner surface of the housing to an outside of the frame member through the releasing region of the frame member.

4. The electronic device of claim 3, wherein a tip of the rib extending to the outside of the frame member is converged toward the inner surface of the housing and is tilted.

5. The electronic device of claim 1, wherein a recess is formed in an upper end of the frame member facing the receptacle to permit the deformed portion of the pressed and deformed elastic member to protrude.

6. The electronic device of claim 5, wherein the recess is continuous with the releasing region.

7. The electronic device of claim 1, wherein the elastic member comprises a sponge member and a conductive cloth member wound on the sponge member, and the cloth member faces the releasing region when the elastic member is received in the frame member.

8. An electronic device comprising:
a housing having a conductive layer provided on an inner surface thereof;
a conductive elastic member;

a component to be housed in the housing, the component abutting on the elastic member from a side opposite to the inner surface of the housing and pressing the elastic member against the inner surface of the housing; and a peripheral wall portion to be positioned in the housing, the peripheral wall portion comprising an abutment portion having an opening portion provided thereat and abutting on a side surface of the elastic member, the peripheral wall portion thereby surrounding the elastic member.

* * * * *